H. GROB.
DRIVE MECHANISM.
APPLICATION FILED JAN. 9, 1911. RENEWED MAR. 5, 1918.
1,261,746.
Patented Apr. 2, 1918.
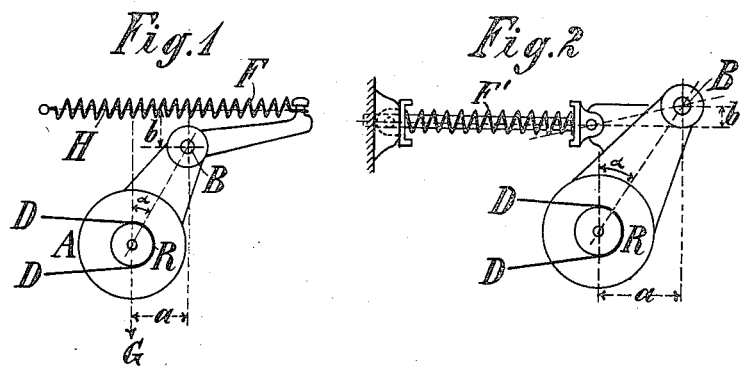
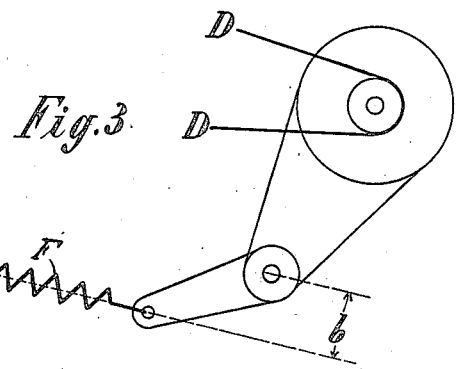
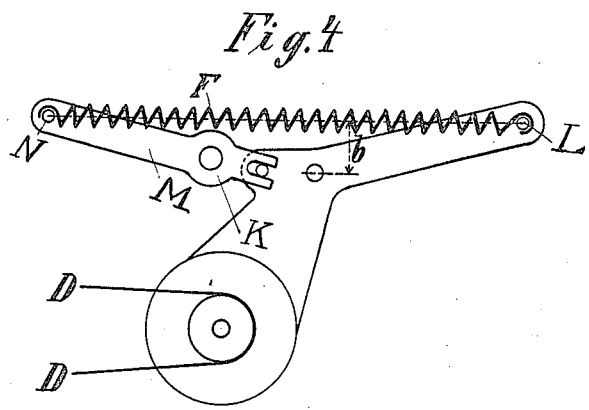
Witnesses:
Inventor:
Hugo Grob.

UNITED STATES PATENT OFFICE.

HUGO GROB, OF ZURICH, SWITZERLAND, ASSIGNOR TO JULIUS PINTSCH AKTIEN-GESELLSCHAFT, OF BERLIN, GERMANY.

DRIVE MECHANISM.

1,261,746.

Specification of Letters Patent. Patented Apr. 2, 1918.

Application filed January 9, 1911, Serial No. 601,726. Renewed March 5, 1918. Serial No. 220,619.

*To all whom it may concern:*

Be it known that I, HUGO GROB, a citizen of Switzerland, and residing at Zurich, Switzerland, have invented new and useful Improvements in Drive Mechanism, of which the following is a full, clear, and exact description.

This invention relates to a drive mechanism, and with regard to certain more specific features, to apparatus suitable for driving a train-lighting dynamo from a car axle.

The invention has for one object the provision of a drive mechanism which will be at once efficient, durable and dependable in operation.

Another object of the invention is the provision of improved means whereby the tension on the belt or other power-transmitting medium may be influenced by the weight of the dynamo.

Another object is the practical utilization of a spring, in conjunction with the weight of the dynamo, for maintaining the belt taut.

Another object is the provision of a simple and reliable means for automatically keeping constant the belt tension, irrespective of the lengthening of the belt.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the drawings, in which are shown one or more of various possible embodiments of my invention,—

Figure 1 is a diagrammatic representation of the invention used in connection with a tension spring;

Fig. 2 is a similar diagram showing the employment of a compression spring;

Fig. 3 is a further modification, illustrating a dynamo mounted above its point of support, and Fig. 4 shows a modification wherein both ends of the spring are movable.

Similar reference characters refer to similar parts throughout the different views of the drawings.

Referring now to Fig. 1, a dynamo, represented at A, is suspended from the pivot B with the line connecting the center of gravity of the dynamo and the point of support B making an angle $\alpha$ to the vertical. The dynamo is driven by a belt D passing around the pulley R and deriving its power from one of the car axles. It is obvious that the dynamo tends to rotate counter-clockwise about its point of suspension B; considering the case as a simple pendulum, the force of restitution would be equal to $W \sin\alpha$, where W is the weight of the dynamo and $\alpha$ the angular displacement from the vertical of the line connecting the center of gravity of the dynamo with the point of support B. For practical purposes the belt tension, due to the weight of the dynamo, may be considered as proportional to the moment of force $W \times a$, where $a$ is the horizontal component of the distance from the center of gravity of the dynamo to the point of support B. As the belt lengthens the distance $a$ varies, and in order to automatically maintain the belt-tension constant, I cause the belt tension to be affected by a second moment of force which varies in such a way that the algebraic sum of the two moments, and therefore the belt tension, is maintained at a predetermined value. This object may be attained in various ways, and I have illustrated in the drawings a spring for this purpose. In Fig. 1 the tension spring F is mounted in such a way as to add to the belt-tension due to the weight of the dynamo to an extent proportional to the strength of the spring, multiplied by the normal $b$ between the axis H of the spring and the point of suspension B of the dynamo. It will be seen from Fig. 1 that as $a$ decreases $b$ increases; and the parts are so proportioned that the decrease of belt-tension due to the decrease of $a$ as the dynamo swings counter-clockwise, is offset by a corresponding increase in the belt-tension due to the spring F, owing to the increase of the moment arm $b$. It is true that the variations in these two moments probably do not balance each other with mathematical precision; but for all practical purposes the belt-tension may be said to be a constant quantity.

It is not necessary that a tension spring be employed. In Fig. 2 I have illustrated a compression spring F' aiding the effect of the weight of the dynamo and increasing in its effect on the belt-tension as the effect due to the weight of the dynamo decreases. If desired, the distance $a$ in Fig. 2 may be increased by swinging the dynamo clockwise until the center line of the spring is above the point of suspension B, in which case the spring would initially oppose the weight of the dynamo; then as the belt lengthens a decrease of the distance $a$ would be accompanied by a decrease in the distance $b$ until the effect of the spring becomes zero, and thereafter, as the distance $b$ increases with opposite sign, the spring would aid the weight of the dynamo to an increasing extent proportional to the continually decreasing effect of the weight of the dynamo.

The dynamo need not be suspended as in Figs. 1 and 2. Thus in Fig. 3 is illustrated a dynamo mounted above its point of support so that a lengthening of the belt is accompanied by an increase in the belt-tension due to the weight of the dynamo, together with a corresponding decrease in the effect of the tension spring F.

The invention may also be exemplified in a device in which the spring is not fixed to the truck at either end, thus making it possible to vary more rapidly the effect of the spring on the belt-tension. In Fig. 4 the spring F is fastened at one end, as before, to the dynamo frame at L, but the other end is secured to the end N of a lever M pivoted to the car truck at K. The lever is so connected with the dynamo frame that, as the belt becomes longer, not only will the end of the spring attached to the dynamo frame at L move upwardly, but also the other end, at N, and thus a considerably more rapid increase of the distance $b$ is attained than is the case in Figs. 1, 2 and 3.

Stated briefly, the illustrated embodiments of the invention comprise a belt drive for a dynamo so mounted that its weight influences the belt-tension; and any variations in the effect of this weight on the belt-tension are offset by equal and opposite variations in the effect on said tension of a spring.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In a drive mechanism, in combination, a belt, means adapted to influence the belt tension, and means adapted to automatically offset variations in the effect of said first means on said belt tension.

2. In a drive mechanism, in combination, a belt, a driven member, and a spring, said driven member and said spring being coöperatively related to each other to automatically maintain constant the tension of said belt.

3. In a drive mechanism, in combination, a belt, a dynamo held in equilibrium by the tension of the belt, and a spring coöperating with the dynamo and adapted automatically to maintan constant the belt tension.

4. In a drive mechanism, in combination, a belt, a dynamo, means whereby the weight of the dynamo influences the belt tension, and means for automatically compensating for variations in the effect of said weight on said tension.

5. In a drive mechanism, in combination, a belt, a dynamo, means for supporting the dynamo whereby the weight of the dynamo influences the belt tension, and means for automatically compensating for variations in the effect of said weight on said tension.

6. In a drive mechanism, in combination, a belt, a dynamo, a pivotal mounting for the dynamo whereby the weight of the dynamo influences the belt tension, and means for automatically compensating for variations in the effect of said weight on said tension.

7. In a drive mechanism, in combination, a belt, a dynamo, means whereby the weight of the dynamo influences the belt tension, and means adapted to influence the belt tension, said second means adapted to coöperate with the dynamo to maintain the belt tension substantially independent of variations in the length of the belt.

8. In a drive mechanism, in combination, a belt, a dynamo, means whereby the weight of the dynamo influences the belt tension, and means comprising a spring for automatically compensating for variations in the effect of said weight on said tension.

9. In a drive mechanism, in combination, a belt, a dynamo the weight of which is adapted to influence the belt tension, a spring, means for mounting the spring so that variations in the effect of the weight of the dynamo on the belt tension are compensated for by variations in the effect of the spring on said tension.

10. In apparatus of the character described, in combination, a dynamo, a driving belt therefor, means including a pivotally mounted element whereby the weight of the dynamo affects the belt tension, and a device connected to said element for also affecting the belt tension, the aforesaid parts being so disposed that as said element moves the distance of the line of the force exerted by said device from the axis of said element is changed to compensate for the effect of variations in belt tension due to the weight of said dynamo.

11. In apparatus of the character described, in combination, a dynamo, a driving belt therefor, means including a rotatable element whereby the weight of the dynamo affects the belt tension, and a device connected to said element for also affecting the belt tension, the aforesaid parts being so disposed that as said element rotates in one or the other direction the distance of the line of the force exerted by said device from the axis of said element is correspondingly increased or decreased in a manner to compensate for the effect of variations in belt tension due to the weight of said dynamo.

12. In apparatus of the character described, in combination, a dynamo, a driving belt therefor, means whereby the weight of the dynamo affects the belt tension, including a pivoted member forming a supporting element for the dynamo, and a device connected to said member and adapted to affect the belt tension, the aforesaid parts being so disposed that as said member rotates the distance of the line of the force exerted by said device from the axis of said member is varied in a manner to compensate for the effect of variations in belt tension due to the weight of said dynamo.

13. In apparatus of the character described, in combination, a dynamo, a belt adapted to drive the same, means whereby the weight of the dynamo affects the belt tension comprising a rotatable member forming a supporting element for the dynamo, a device connected to said member and adapted to affect the belt tension, the aforesaid parts being so disposed that as said member rotates in one or the other direction the effective angle of the line of the force exerted by said device with respect to the axis of said member is respectively increased or decreased in a manner to compensate for the effect of variations in belt tension due to the weight of said dynamo.

14. In apparatus of the character described, in combination, a dynamo, a belt adapted to drive the same, a spring coöperatively associated with the belt to affect the belt tension, means whereby the weight of the dynamo affects the belt tension comprising a rotatable element connected to the spring and serving as a support for said dynamo, said spring and said rotatable element being so related that variations in belt tension caused by the effect of the weight of the dynamo are compensated for by variations in the effect of the spring.

15. In apparatus of the character described, in combination, a driven member, a belt adapted to drive the same, a rotatable body connected with said driven member, and a spring connected to said body and so disposed that as the body rotates the line of the force exercised by the spring changes its distance from the axis of the rotatable body in such manner that the belt tension will be maintained constant.

16. In apparatus of the character described, in combination, a dynamo, a belt adapted to drive the same, a rotatable body connected with the dynamo, a spring connected to said body and adapted to affect the tension on the belt, and so disposed that as the belt elongates the distance of the line of the force of the spring from the axis of the rotatable body changes in such manner that the belt tension will remain substantially constant.

17. In apparatus of the character described, in combination, a dynamo, a belt adapted to drive the same, a rotatable body connected with the dynamo, a spring connected to said body and adapted to affect the tension on the belt, and so disposed that as the belt elongates the line of the force exercised by the spring increases in distance from the axis of the rotatable body.

18. In apparatus of the character described, in combination, a driven member, a belt adapted to drive the same, a rotatable body forming a supporting element for said driven member, and a spring connected to said body adapted to affect the belt tension, and so disposed that as the belt elongates the distance of the line of the force of the spring from the axis of the rotatable body changes in such manner that the belt tension will remain practically constant.

19. In apparatus of the character described, in combination, a dynamo, a belt adapted to drive the same, a rotatable body forming a supporting element for the dynamo, and a spring connected to said body adapted to affect the belt tension and so disposed that as the belt elongates the line of the force exercised by the spring increases in distance from the axis of the rotatable body.

20. In a driving mechanism, in combination, a belt, a device adapted to be driven thereby, a pivoted suspension member upon which said device is carried, an arm attached to said suspension member, and a spring attached at one end to said arm and adapted to compensate for variations in tension of said belt caused by different positions of said pivoted suspension member.

21. In a device of the character described, in combination, a suspension member, a pivot therefor, a dynamo carried thereby, a belt for imparting motion to said dynamo, and a spring attached to a point on said suspension member and to an external point, said points being so related that the effective moment of the force of said spring on said member is adapted to compensate at all times for the effect of variations in the moment of the weight of said dynamo about said pivot.

22. In a device of the character described, in combination, a suspension member, a pivot therefor, a dynamo carried thereby, a belt for imparting motion to said dynamo, and a spring connected to said member so that the moment of force of said spring about said pivot shall at all times compensate for variations in the moment of the weight of said dynamo about said pivot in order that the tension of said belt may be maintained constant.

23. In a drive mechanism, in combination, a driven member, a belt for driving the same, means whereby the weight of said driven member influences the tension of said belt, and a second means adapted to influence the tension of said belt, said second means being adapted to automatically compensate for variations in the effect of said weight upon the tension of said belt.

24. In a drive mechanism, in combination, a driving member, a member to be driven, said members being movably mounted relatively to each other, a driving belt connecting said members, one of said members being mounted so that movement relative to the other member varies the moment of the weight of said movable member, and means adapted to offset variations in the effect of the weight of said movable member upon the tension of said belt.

25. In a drive mechanism, in combination, a driving member, a driven member, a belt connecting said members, and means whereby the conjoint action of a mechanical force and the weight of said driven member counteract variations in length of the belt so as to produce a constant tension of the latter.

26. In a drive mechanism, in combination, a driving member, a driven member, a belt connecting said members, and means whereby the conjoint action of a mechanical force and the weight of said driven member counteract variations in the position of the driving and driven members relative to each other so as to produce a constant tension of the connecting belt.

27. In a mounting for railway-car lighting-dynamos, in combination, means for supporting a dynamo to allow limited movement thereof toward or from its driving element, a driving belt for said dynamo, and means including a spring mounted for control by the said movement of the dynamo to tend to counteract the effect of said movement on the tension of said belt for thereby tending to maintain said tension constant.

In testimony whereof I affix my signature in the presence of two witnesses.

HUGO GROB.

Witnesses:
WOLDEMAR HAUPT,
HENRY HASPER.